(12) United States Patent
Agarwal et al.

(10) Patent No.: US 9,460,160 B1
(45) Date of Patent: *Oct. 4, 2016

(54) SYSTEM AND METHOD FOR SELECTING USER GENERATED CONTENT RELATED TO A POINT OF INTEREST

(71) Applicant: Google Inc., Mountain View, CA (US)

(72) Inventors: Sameer Agarwal, Seattle, WA (US); Steven Maxwell Seitz, Seattle, WA (US); David Robert Gallup, Bothell, WA (US)

(73) Assignee: Google Inc., Mountain View, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 14/509,682

(22) Filed: Oct. 8, 2014

Related U.S. Application Data

(63) Continuation of application No. 13/306,942, filed on Nov. 29, 2011, now Pat. No. 8,880,535.

(51) Int. Cl.
*G06F 17/30* (2006.01)

(52) U.S. Cl.
CPC ..... *G06F 17/3053* (2013.01); *G06F 17/30241* (2013.01); *G06F 17/30247* (2013.01)

(58) Field of Classification Search
None
See application file for complete search history.

(56) References Cited

U.S. PATENT DOCUMENTS

| | | |
|---|---|---|
| 5,598,515 A | 1/1997 | Shashua |
| 7,913,192 B2 | 3/2011 | Dicke et al. |
| 8,060,108 B1 | 11/2011 | Rayburn et al. |
| 8,060,510 B2 | 11/2011 | Ghanekar et al. |
| 8,131,118 B1 | 3/2012 | Jing et al. |
| 8,392,430 B2 | 3/2013 | Hua et al. |
| 8,433,140 B2 | 4/2013 | Ke et al. |
| 2002/0062193 A1 | 5/2002 | Lin |
| 2007/0258642 A1 | 11/2007 | Thota |
| 2008/0014964 A1 | 1/2008 | Sudit et al. |
| 2008/0086468 A1 | 4/2008 | Jing et al. |
| 2008/0267504 A1 | 10/2008 | Schloter et al. |
| 2009/0083275 A1 | 3/2009 | Jacob et al. |
| 2009/0290812 A1 | 11/2009 | Naaman et al. |
| 2010/0272348 A1 | 10/2010 | Pulla et al. |
| 2010/0303342 A1 | 12/2010 | Berg et al. |
| 2011/0006977 A1 | 1/2011 | Khosravy et al. |
| 2012/0011129 A1 | 1/2012 | van Zwol et al. |
| 2012/0301014 A1 | 11/2012 | Xiao et al. |

OTHER PUBLICATIONS

Agarwal, Sameer, et al., Building Rome in a Day, Communications of the ACM, Oct. 2011, pp. 105-112 vol. 54, No. 10.

(Continued)

*Primary Examiner* — Bai D. Vu
(74) *Attorney, Agent, or Firm* — Lerner, David, Littenberg, Krumholz & Mentlik, LLP

(57) ABSTRACT

A system and machine-implemented method for providing one or more photos associated with a point of interest on a map, the method including receiving an indication of a request from a user to view photos associated with a point of interest on a map, identifying a set of photos associated with the point of interest, wherein the photos comprise at least one of photos taken from the point of interest or photos that depict at least part of the point of interest, ranking the photos within the set of photos according to ranking criteria, wherein the ranking criteria comprises one or more of map context, photo quality, photo type or user request information and providing one or more photos of the set of photos to the user according to the ranking.

20 Claims, 4 Drawing Sheets

(56) References Cited

OTHER PUBLICATIONS

Agarwal, Sameer, et al., Building Rome in a Day, International Conference on Computer Vision, 2009, pp. 1-8, Kyoto, Japan.
Agarwal, Sameer, et al., Building Rome in a Day, retrieved from <http://grail.cs.washington.edu/rome/>, retrieved on Nov. 29, 2011, pp. 1-3.
Agarwal, Sameer, et al., Reconstructing Rome, Jun. 2010, pp. 40-47, Published by the IEEE Computer Society.
Frahm, Jan-Michael, et al., Building Rome on a Cloudless Day (ECCV 2010), ECCV-10 submission ID 342, pp. 1-14.
Snavely, Noah, et al., Photo Tourism Exploring Photo Collections in 3D, retrieved from <http://phototour.cs.washington.edu/>, retrieved on Nov. 29, 2011, pp. 1-2.
Snavely, Noah, et al., Photo Tourism: Exploring Photo Collections in 3D, ACM Transactions on Graphics (SIGGRAPH Proceedings), 2006, pp. 835-846, 25(3).

SYSTEM AND METHOD FOR SELECTING USER GENERATED CONTENT RELATED TO A POINT OF INTEREST

CROSS-REFERENCE TO RELATED APPLICATIONS

The present application is a continuation of U.S. application Ser. No. 13/306,942 filed Nov. 29, 2011, the disclosure of which is incorporated herein by reference.

BACKGROUND

The subject disclosure generally relates to providing user generated photos to users, and, in particular, presenting photos of an object or landmark to a user.

User generated content (UGC) may comprise many different images of objects and/or places. These images may be placed in a map to provide users with an idea of what places may look like at certain locations on the map. However, because of the large volume of images generated by users, it is often difficult to select a suitable set of images to present to the user at a particular point on the map.

Currently, images are placed on the map according to latitude/longitude associated with the photo, and this is typically not very accurate. Even if the general location of the images are accurate, the images themselves may not convey any orientation information as to which direction the images were taken from or what the images are looking at. As a result, these images on the map would not necessarily convey useful information to a user. Further, two images taken at the same place and in the same orientation may have completely different focal lengths, giving very different views of the same object (e.g., one zoomed in focusing on a detail and another one which looks at the object/place as a whole).

Thus, it may be desirable to select and present photos to a user according to the map context and other related information.

SUMMARY

The disclosed subject matter relates to a machine-implemented method for providing one or more photos associated with a point of interest on a map, the method comprising receiving an indication of a request from a user to view photos associated with a point of interest on a map. The method further comprising identifying a set of photos associated with the point of interest, wherein the photos comprise at least one of photos taken from the point of interest or photos that depict at least part of the point of interest. The method further comprising ranking the photos within the set of photos according to ranking criteria, wherein the ranking criteria comprises one or more of map context, photo quality, photo type or user request information and providing one or more photos of the set of photos for display to the user according to the ranking.

The disclosed subject matter also relates to a system for providing one or more photos associated with a point on a map, the system comprising one or more processors and a machine-readable medium comprising instructions stored therein, which when executed by the processors, cause the processors to perform operations comprising receiving a selection from a user corresponding to a point of interest on a map. The operations further comprising identifying the point of interest in response to the selection from the user. The operations further comprising identifying a set of photos associated with the point of interest and ranking the photos within the set of photos according to ranking criteria, wherein the ranking criteria comprises one or more of map context, photo quality, photo type or user request information.

The disclosed subject matter also relates to a machine-readable medium comprising instructions stored therein, which when executed by a machine, cause the machine to perform operations comprising receiving an indication of request from the user, the request comprising one of a selection of a point on the map, a region on the map or a text query corresponding to a point or region on the map. The operations further comprising identifying one or more cells within the map corresponding to the request, wherein the map is partitioned into a plurality of cells including the one or more cells. The operations further comprising identifying a set of photos associated with the one or more cells. The operations further comprising ranking the photos within the set of photos according to a ranking criteria, wherein the ranking criteria comprises one or more of map context, photo quality, photo type or user request information and providing one or more photos of the set of photos for display to the user according to the ranking.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
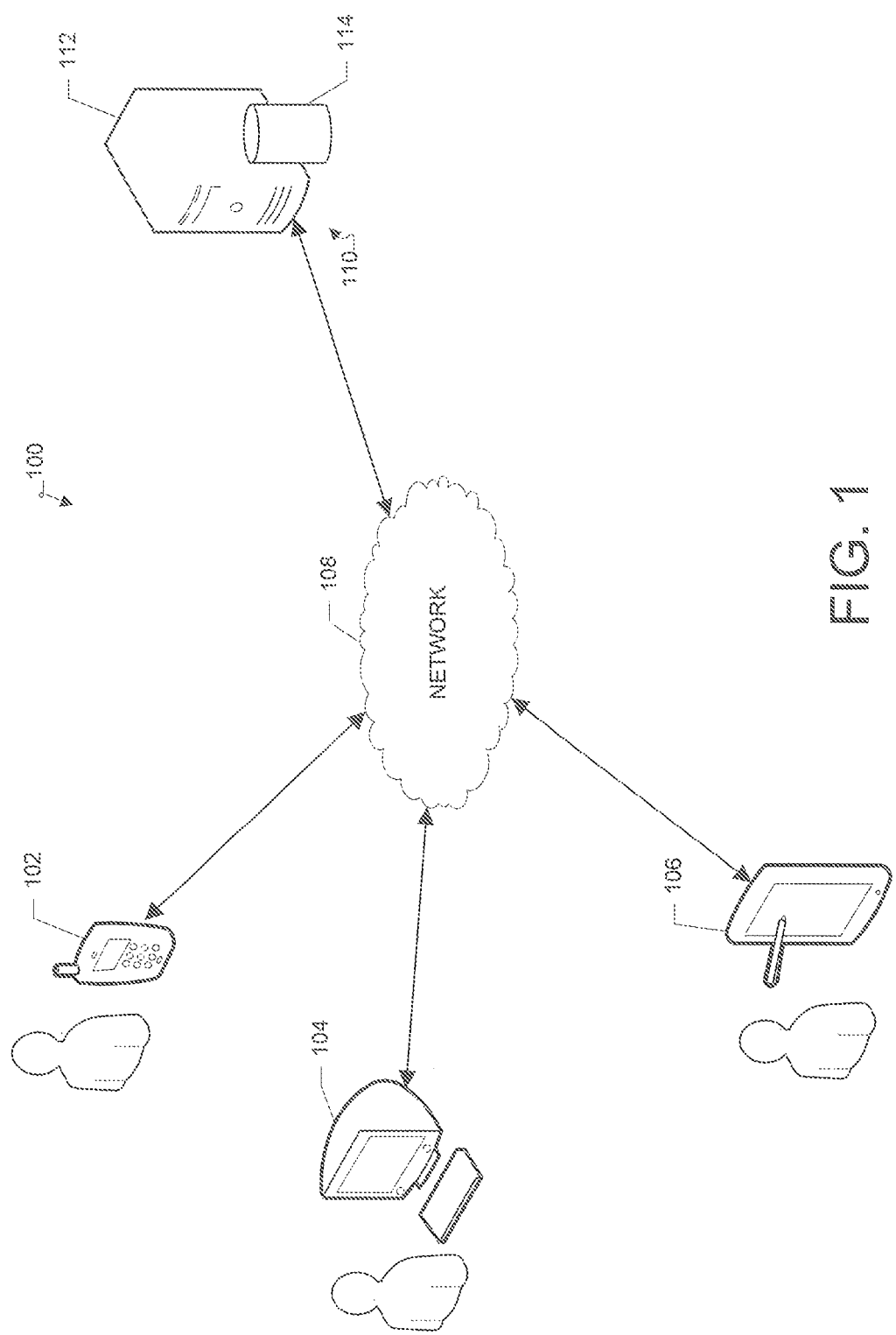
FIG. 1 illustrates an example client-server network environment which provides for selecting user generated photos for presentation to a user.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As used herein, the phrase "user generated content" (UGC) may include but is not limited to multi-media content added, published or provided by a user at a website, or other internet based or software client application. UGC may include but is not limited to images of objects, landmarks and/or places that can be represented on a map as a point or region. The terms images, photos and user generated content are used interchangeably throughout the application and refer to image content taken by a user and depicting a point or region within the map. These images may be placed in a map to provide users with an idea of what places may look like at certain locations on the map. The subject disclosure provides a method of selecting user generated photos relating to a particular point of interest (e.g., a landmark) on a map to a user.

Each of the images may be matched with a particular point of interest on a map, and further organized by the zoom level of each of the images, the angle at which each of the images are taken, the particular side of a point of interest that each image is of, and/or other suitable criteria. For example, a collection of photos of the Eiffel tower may be organized into photos of the Eiffel tower from the North, South, East, and West sides. The photos may also be organized into different groups that view the Eiffel tower from up close and from far away. The images that are presented may vary depending on the user's zoom level of the map, the location that the user desires to view, the popularity of a particular view, the quality of an image, the time at which the image was taken, and other criteria.

The term "map," as used herein, may include but is not limited to a visual representation of an area and may include a symbolic depiction highlighting relationships between elements of that space. A user may request to view photos relating to a point of interest with the map (e.g., a landmark). The term "point of interest," as used herein, includes but is not limited to, a point or region on a map represented by one or more cells within the map. For example, a user may select a point or region on the map or otherwise indicate a particular point of interest. A point of interest on the map may be defined as a single point (e.g., a specific longitude/latitude) associated with a cell within the map. Similarly, a point of interest may refer to a region on the map, defined as a polygon or set of polygons, and covering one or more cells within the map. Furthermore, the user may indicate a point of interest by entering a text entry corresponding to a point or region of interest within the map. The text query may for example include latitude/longitude coordinates, a name of a landmark, an address corresponding to the point of interest or other identifiers of a point or region within a map. Once the point of interest is identified, the system selects one or more photos to return to the user.

The system may maintain a spatial index that stores a list of all photos associated with each cell or some subdivision of the map. The map cells may be sized such that they occupy a certain area of screen space measured in pixels (e.g., 10×10 pixels). Thus, the subdivision depends on the zoom level and a different spatial index may be computed for each zoom level.

Photos may be associated with cells in the spatial index two ways. First, photos may be associated with the cell if they "see" any of the scene that occupies that cell. The set of photos for a scene (e.g., landmark) are run through the Structure from Motion (SfM) system to get a geo located sparse 3D model and image pose, orientation, and other information relating to the scene. The 3D reconstruction contains the coarse geometry of the scene content in the form of a point cloud, and it also contains visibility information, such that it may be determined which photos see which points. Each point is projected to latitude, longitude, and altitude coordinates and it is determined which cell contains the latitude and longitude and altitude coordinates. In one example, each point may be projected to latitude and longitude coordinates where only a 2D spatial index is being used (e.g., in the case of maps) and the altitude may be discarded. Thus, all photos that see a point within a cell are added to that cell's set of photos. Second, photos are associated with the cells that contain the point from which the photo was taken. The photo position, or camera center, is known from the 3D reconstruction. More specifically, the system determines camera position as well as the 3D orientation and focal length of the camera to identify the photos taken from a location.

In response to a user request, the one or more cells containing the point of interest indicated by the user are determined and all the photos associated with the one or more cells are retrieved. The number of photos associated with the one or more cells representing a point of interest is likely to be large. Thus, the system may rank the photos and may then select a subset of the photos in response to the user request.

All photos associated with the query point can be ranked according to map context, intrinsic photo quality, alignment, visibility (e.g., how well the photo sees the point of interest), whether the point of interest contains mostly photos that see or are "from" the point of the interest and/or whether the user has requested photos that see the point or are taken from the point. Map context includes the current map viewport (latitude and longitude rectangle), map heading (N, E, S, W), map zoom level (size of the latitude and longitude rectangle), and map tilt. Photo quality may be defined by criteria such as resolution, sharpness, exposure and contrast. The alignment criteria focuses on selecting photos that align with the viewing direction of the user with respect to the point of interest based on the 3D spatial model of the point of interest.

Additionally, the system may determine the percentage of photos associated with the cell (and/or nearby cells) that are from or "of" the scene, referred to hereinafter as photo type. If the point or region query contains most from photos, it is likely that the location is a hot spot for from photos and vice versa. This knowledge can be used to rank the retrieved list based on photos that are of and from the one or more cells. Finally, the system looks at whether the photo is a photo that "sees" the point of interest or is taken from the point of interest to further rank the retrieved list of photos.

Furthermore, context information such as the time and date may be considered as ranking criteria to display photos taken in a similar context (time, date, season) as the context of the user request. Once the ranking is completed the best photo or the top N photos, or the entire list may be returned to the user according to the ranking.

FIG. 1 illustrates an example client-server network environment which provides for selecting user generated photos for presentation to a user. A network environment 100 includes a number of electronic devices 102, 104 and 106 communicably connected to a server 110 by a network 108. Server 110 includes a processing device 112 and a data store 114. Processing device 112 executes computer instructions stored in data store 114, for example, to assist in selecting user generated content (e.g., photos) relating to a point of interest on a map.

In some example embodiments, electronic devices 102, 104 and 106 can be computing devices such as laptop or desktop computers, smartphones, PDAs, portable media players, tablet computers, or other appropriate computing devices that can be used to select or view photos associated with a point or region on a map. In the example of FIG. 1, electronic device 102 is depicted as a smartphone, electronic device 104 is depicted as a desktop computer, and electronic device 106 is depicted as a PDA.

In some example aspects, server 110 can be a single computing device such as a computer server. In other embodiments, server 110 can represent more than one computing device working together to perform the actions of a server computer (e.g., cloud computing). Furthermore, network 108 can be a public communication network (e.g., the Internet, cellular data network, dialup modems over a telephone network) or a private communications network (e.g., private LAN, leased lines). The server 110 may host the present system for selecting user-generated images associated with a point of interest for presentation to the user.

In one example, the system may maintain a spatial index of user generated photos assigned to one or more cells of a hierarchical subdivision of the 2D map space. For example, the collection of user generated photos and/or the spatial index may be stored locally at data store 114 and/or remotely at one or more remote data storage devices.

A user interacting with a client device 102, 104 or 106 may indicate a point of interest (e.g., a point or region) within a map. The user may interact with the system through a software or browser-based client application at the client device. In response to a user request, the system may identify a point of interest corresponding to the request by the user and may determine one or more cells within the map corresponding to the identified point of interest. The system then references the spatial index maintained by the system (e.g., stored at data store 114 or at one or more remote databases) and identifies a set of photos associated with the one or more cells. The system may rank the photos according to a ranking function and may return the first, the top N (where N may be a predefined or dynamically defined number) or entire ranked list of photos to a user at a client device (e.g., through network 108).

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
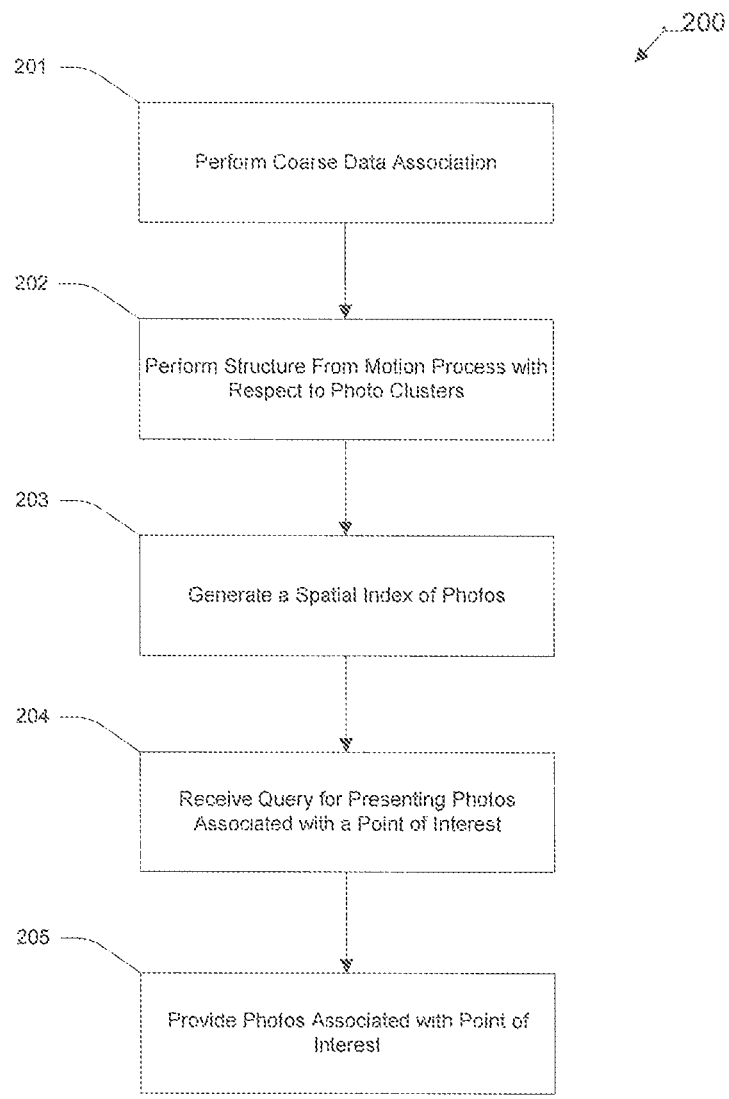
FIG. 2 illustrates an example process for providing user generated images corresponding to a point of interest.

FIG. 2 illustrates an example process 200 for providing user generated images corresponding to a point of interest. In step 201, the system identifies a collection of user generated photos available. The collection may include all photos within one or more databases covering various points of a map. The system then performs coarse data association with respect to all user generated photos available. The user generated photos may be stored at a database such as data store 114 and/or one or more remote databases accessible by the system (e.g., through network 108). The system retrieves the user generated photos and clusters the collection of photos to form smaller groups based on user or camera provided location, user provider text tags, and whole image visual features. The groups include photos associated with the same point of interest/landmark according to GPS and/or geotags and textual tags associated with the photos. Images are matched with one another according to such data, such that images associated with the same point or region (e.g., landmark) within the map are grouped into the same group or cluster.

Next, in step 202, the photo clusters associated with a point of interest (e.g., landmark) are processed through the Structure from Motion (SfM) system. The structure from motion (SfM) process computes precise position and orientation automatically from images. The output of the SfM system is a sparse point cloud of the point of interest (e.g., object or landmark) and precise information about the position, orientation and focal length of the camera that captured the images. Using the GPS information associated with these photographs or via manual means, it is then possible to place these photographs in an earth centered coordinate system. The SfM process of step 202 will result in information for the user generated images including position, orientation and set of 3D points visible in each photo.

Next, in step 203, the system generates a spatial index of all of the user generated photos. Each photo is assigned to one or more cells of a hierarchical subdivision of the 2D map space or a 3D space. The spatial index may maintain a list of all photos associated with each cell of some subdivision of the 2D space (e.g., the 2D map space) or 3D space (e.g., street view or other ground-based 3D space). A cell defines a subdivision of the 2D space or 3D space, where the space is partitioned into smaller subdivisions for the purpose of mapping photos to the landmarks and/or other object within the 2D or 3D space. In one example, the cells are sized such that they occupy a certain area of screen space measured in pixels (e.g., approximately 10×10 pixels/cell). Thus, the subdivision may be dependent on the zoom level and a different spatial index may be computed for each zoom level.

First, photos may be associated with a cell if they see any of the scene that occupies that cell. That is, the photo is added to each cell that contains a 3D point visible in that view, and added as a view of. The 3D reconstruction contains the coarse geometry of the scene content in the form of a point cloud, and it also contains visibility information such that it is possible to determine which photos see which points. Each point is projected to latitude and longitude coordinates (within a 2D space) or latitude, longitude and altitude coordinates (within a 3D space). Next, it is determined which cell contains the latitude and longitude coordinate, and all photos that see the point are added to the set of photos associated with the cell.

Additionally, a photo is associated with a cell as a view from the cells if the cell contains the "camera center". That is, photos are associated with the cells that contain the point (e.g., defined by a latitude/longitude or latitude/longitude/altitude) from which the photo was taken. The position of camera center (i.e., the position from which a photo is taken) may be known from the 3D construction. Once the spatial index of all user generated photos is built, the spatial index may be stored in one or more databases (e.g., data store 214 and/or one ore more remote data storage devices). Examples throughout the specifically may refer to 2D spatial index for use in a 2D map space for exemplary purposes, however, it should be understood that similar processes may be used for providing photos to users viewing a 3D space.

In step 204, the system receives a query for presenting photos associated with a point of interest (e.g., landmark, object, a point or regions on the map, or textual entry). Users may indicate a desire to see photos by clicking on a point or selecting a region on the map. Similarly, users may enter a text query corresponding to a point of interest on the map.

Upon receiving the user's query, the system retrieves the spatial index and selects photos associated with the point of interest for provision to the user in response to the query at step 205. The process of selecting photos for provision to a user in response to a user query is described in further detail below with respect to FIG. 3.

Figure 3:
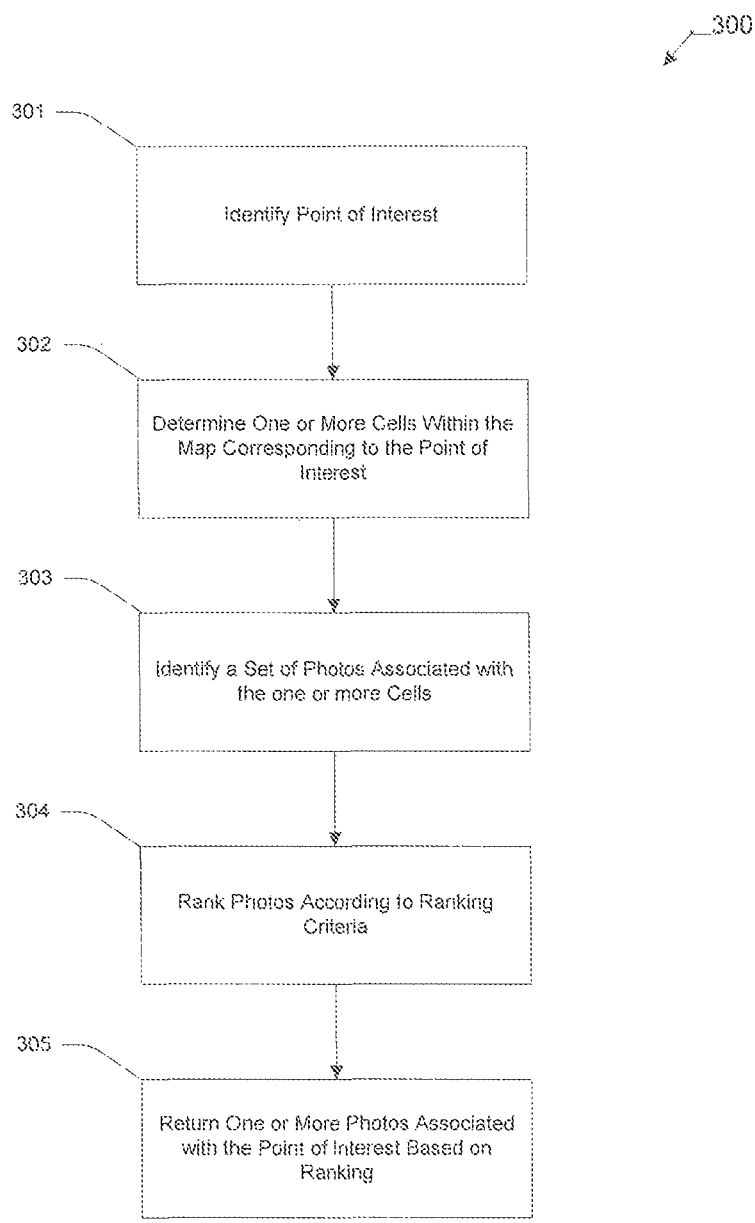
FIG. 3 illustrates an example process for selecting photos associated with a point of interest for provision to a user.

FIG. 3 illustrates an example process 300 for selecting photos associated with a point of interest for provision to a user. In step 301, the system identifies a point of interest, defined by a point or a region query indicated by the user. Users may indicate a desire to see photos by clicking on a point on the map, selecting or highlighting a region on the map, or by entering a text query corresponding to a point or region on the map. Once that point of interest is identified, the process continues to step 302. In step 302, the system identifies one or more cells within the map corresponding to the identified point of interest. The one or more cells correspond to the one or more cells that include a point or cover the region indicated by the user.

Next, in step 303, the system identifies a set of photos associated with the one or more cells identified in step 302. As described above, a spatial index is built that stores a list of all photos associated with each cell of some subdivision of the map. The map cells are sized such that they occupy a certain area of screen space measured in pixels. A different spatial index may be available for each zoom level. Thus, the system may select the spatial index according to the zoom level. The zoom level specificity allows for the system to return photos to the user based on the area that is covered by a point or region selected by the user. That is, if the user is looking at a map in a high level (e.g., zoomed out), then a point or region covers a larger area and thus the photos returned to the user may have a similar level of detail (e.g., a photo which looks at the object/place as a whole and may include surrounding scenery). On the other hand, if the user is zoomed into the map, then a point or region is associated with photos more specifically focusing on the point of interest (e.g., zoomed in focusing on a detailed portion of a landmark or object).

Using the spatial index, the system retrieves a set of photos associated with the one or more identified cells and continues to step 304. The list of photos associated with one or more cells can be quite large. Thus, in step 304, the system ranks the photos according to various ranking criteria.

The current map context is a useful indication of the most relevant photos corresponding to the user query. Map context may include the current map viewport (latitude/longitude rectangle), map heading (N, E, S, W), map zoom level (size of the latitude/longitude rectangle), and map tilt. All photos associated with the query point can be ranked according to map context. Additionally, intrinsic photo quality and alignment of each photo may be considered in ranking the set of photos associated with the one or more cells corresponding to the point of interest. Still further, the photos may be ranked according to the photo type (i.e., whether the photos are a photo of or from the one or more cells).

Information retrieved according to the user request may further be taken into account for ranking the photos. For example, where the point of interest is selected according a text query by the user, the system may identify textual tags attached to one or more of the photos within the set identified in step 303 and may compare the textual tags associated with one or more of the photos with the text query to determine the photos with textual tags that best match the query. The textual tags may be associated with the photo by the user taking the photo, adding the photo repository, or by other users who view the photo in this or other applications.

Additionally, the system may determine whether the user request includes a request to view picture taken from and pictures taken of the point of interest indicated by the user. In such instance, the photos of the type requested by the user are given more preference and thus ranked higher on the list. Furthermore, context information such as the time and date may be considered as ranking criteria to display photos taken in a similar context (time, date, season) as the context of the user request.

In one example, each photo (p) can be ranked according to the example cost equation:

$$C(p)=C_{context}(p)+\lambda_{photo}C_{photo}(p)+\lambda_{type}C_{type}(p) \qquad \text{(Equation 1)}$$

where C refers to the overall cost of a photo (e.g., photo p), $C_{context}$ refers to the context penalty of the photo, $C_{photo}$ refers to the quality penalty of the photo and $C_{type}$ refers to the type penalty of the photo. The $\lambda$ parameters the above equation are weights that balance the contribution of each penalty (e.g., $\lambda_{photo}$ is a weight assigned to photo quality penalty and $\lambda_{type}$ is a weight assigned to the type penalty).

According to this example cost equation, a photo is ranked according to factors including map context, photo quality and photo type (of and from photos). The map context penalty ($C_{context}$) may for example be calculated according to the example equation:

$$C_{context}(p)=C_{scale}(p)+\lambda_{view}C_{view\text{-}direction}(p)+\lambda_{text}C_{text}(p) \qquad \text{(Equation 2)}$$

where $C_{scale}$ refers to the view point penalty (map context) of the photos and $C_{view\text{-}direction}$ refers to the field of view penalty of the photo. $\lambda_{view}$ is a weight assigned to the view direction penalty. $C_{text}$ refers to the text query penalty of photos. $\lambda_{text}$ refers to the weight assigned to the text penalty.

The view point (map context) penalty may be defined in terms of the current map view port, tilt, and map heading/direction and zoom level. An example equation for defining the map view point penalty may be as follows:

$$C_{scale}(p)=(\text{uncertainty}(X_i^p)-\lambda_{scale}(\text{viewport-width}+\text{viewport-height}))^2 \qquad \text{(Equation 3)}$$

where $X_i^p$ are the 3D points visible from the photo, uncertainty measures the uncertainty of 3D points visible from the photo, viewport-width and viewport-height refer to the width and height of the viewport respectively, and $\lambda_{scale}$ is a weight assigned to the viewport of the photo.

Accordingly, if the uncertainty of points in X is similar to the size of the viewport, the cost will be small. Thus, the equation is likely to select or favor photos that see proportionally the same field of view as the current map viewport.

The field of view (view direction) penalty may be defined as:

$$C_{view\text{-}direction}(p)=a\cos(\text{dot}(Vp,V\text{map})) \qquad \text{(Equation 4)}$$

where Vp is the viewing direction of p and Vmap is the viewing direction of the map camera.

The view point penalty defines the angle between the viewing directions of the map and the viewing direction of the photo and favors photos in which the angle between the viewing direction of the map and the photo is small. If the map is tilted and the map heading is north, then photos that also have a north heading will be favored.

Furthermore, the text query cost $C_{text}$ may be defined by the equation:

$$C_{text}=-\|T_p \cap Q\| \qquad \text{(Equation 5)}$$

where $T_p$ is the set of words from the text tags for photo p and Q is the set of words in the query. The text query cost equation determines the extent to which the text tags of a photograph match the text query entered by a user and penalizes those photos where the text tags of a photograph are not similar to text query terms entered by the user.

The cost equation for ranking photos also looks at the intrinsic quality and alignment of the photo. For each photo, the cost equation determines a photo quality penalty. The photo quality penalty may be defined as:

$$C_{photo}(p)=C_{quality}(p)+\lambda_{alignment}C_{alignment}(p) \quad \text{(Equation 6)}$$

where $C_{quality}$ refers to the intrinsic quality penalty of the photo and $C_{alignment}$ refers to the alignment penalty of the photo. $\lambda_{alignment}$ is a weight assigned to the alignment penalty.

According to the example equation, the intrinsic quality penalty takes into account overall intrinsic quality of the photo, which may determined based upon the visibility of the point of interest (object or landmark) within the photo (e.g., if the object or landmark is occluded by a face or other object, then the photo will receive a lower quality score), the popularity of the photo, human appeal of the photo (e.g., determined based on contrast and saturation) and whether the photo is a panorama.

The intrinsic quality penalty of a photo may for example be defined by the equation:

$$C_{quality}(p) = \frac{1}{\text{num-point}(p)} + \lambda_{reproj}\text{reprojection-error}(p) + \frac{\lambda_{popularity}}{\text{popularity}(p)} + \frac{\lambda_{eye}}{\text{eye-candy}(p)} + \lambda_{panorama}C_{panorama}(p) \quad \text{(Equation 7)}$$

where num-points is the number of points within the geometry of photo, reprojection-error is the reprojection error in the photo, popularity(p) is a popularity score, eyecandy(p) is a score that predicts human appeal of a photograph and $C_{panorama}(p)$ is a panorama penalty having 0 or 1 value, 0 if the picture is a panorama and 1 otherwise. $\lambda_{reproj}$ is a weight assigned to the reprojection penalty, $\lambda_{popularity}$ is a weight assigned to the popularity penalty (1/popularity(p)), $\lambda_{eye}$ is a weight assigned to the human appeal penalty (1/eyecandy (p)), and $\lambda_{panorama}$ is a weight assigned to the panorama penalty.

According to the above equation, poorly reconstructed views, including those having incorrect position and orientation, or photos where the scene content occluded by a face or other object are penalized.

Photos with lower popularity are similarly penalized, where the popularity score determined from number of times the photo has been viewed, "liked", or marked as "favorite" (e.g., on one or more applications providing the photo to users). Higher popularity will decrease the penalty. Human appeal of a photograph is determined based on features such as contrast and saturation. A higher appeal score will decrease the human appeal penalty. Panoramas allow users to pan and zoom more freely and tend to be higher quality. Therefore, the equation favors such photos when determining photo quality.

Photo alignment penalty determines the alignment of photos with respect to the object corresponding to the point of interest. The photo alignment penalty may depend upon whether the scene is planar. If the scene is planar (e.g. a building facade), photos that view the scene frontally are desired. If the scene is not planar, aligning the viewing direction to the scene is less important in ranking the photos. The alignment penalty for each photo may be calculated according to the equation:

$$C_{alignment}(p)=\text{var}(Z) \text{ where } Z=\{z_i=\text{dot}(X_i^p, V_p)\} \quad \text{(Equation 8)}$$

where $X_i^p$ are the 3D points visible from the photo p and $V_p$ is the viewing direction of photo p.

For each point visible from the photo p, the distance of the point to the camera center along the viewing direction may be measured, and $C_{alignment}$ defines the variance of those distances. Where all points visible from the photo lie on a plane perpendicular to the viewing direction, the alignment penalty will be 0. If the points are planar and the viewing direction doesn't align well, the penalty is likely to be large. If the points are not planar, then the penalty is likely to be roughly constant for any viewing direction.

The last parameter for ranking the photos associated with the cell according to the example cost equation above is a photo type penalty. The photo type penalty determines whether photos are taken of the point of interest or from the point of interest. For example, the number of photos taken from may be compared to photos taken of a point of interest to determine whether the area is more likely to be a hot spot for taking pictures or a spot where pictures are taken of. This may be an indication of which pictures, pictures of or from are likely to be more desirable.

The photo type penalty may be defined by the equation:

$$C_{type}(p)=1-\text{num-photos-of}/\text{num-photos if is-photo-of}(p)$$

$$1-\text{num-photos-from}/\text{num-photos if is-photo-from}(p) \quad \text{(Equation 9)}$$

where num-photos refers to the total number of photos associated with a cell, num-photos-of refers to the number of photos taken of a cell and num-photos-from refers to the number of photos taken of a cell. is-photo-of refers to a photo associated with the cell because it can see a point in the cell (i.e., a picture of). is-photo-from refers to photos where the photo's camera center is in the cell (i.e., a picture from). If most of the photos are of a particular type, then this penalty favors photos that are of that type. A point of interest may be determined to be a popular object or landmark, a popular lookout point, or both (e.g., the top of the Eiffel tower).

The various ranking criteria described above (e.g., referred to as penalties within the cost equation) may be weighted differently (e.g., within the cost equation). For example, the parameters in the above equations are weights that balance the contribution of each penalty. These weights can be determined empirically or may be learned from training examples. A training example may for example be a photo that a skilled human would choose for a given point query and map context. These weights may also be changed according to user preferences. For example, a user may indicate that they only want to see close-up photos. Such preference would for example cause $\lambda_{scale}$ to be decreased.

Once the cost of each photo is calculated, the photos may be ranked in ascending order. While the above equation is presented as an exemplary equation for determining a photo cost and ranking of photos for presentation to a user, it should be understood that various other equations, having one or more additional or alternative variables, may be used for determining a value associated with each photo and for ranking or otherwise organizing and/or selecting photos for provision to a user. In one example, the equation may calculate the benefit (preference) of each photo(p) in lieu of the cost of the photos. In such instance, the order of the photos may be ranked in descending order. The equation may further take into account other variables, in addition to or in lieu of those described above, that would be beneficial in determining an order or preference for photos being provided to users. Once the photos have been ranked, the process continues to step 305.

In step 305, the system provides one or more of the photos associated with the point of interest according to the ranking. The number of photos returned in step 305 may depend upon the specific use case, setting and/or system or user preferences. For example, the user may request a specific number of photos or the system settings may indicate a limit for photos to be presented to the user (e.g., based on a screen size restriction or historical user preferences). Alternatively, the system may only provide a single photo to the user in response to a request. In one example, the photos may be ranked, such that there is a distribution of the type of photos presented to the user (e.g., the angle of views, the zoom level, etc.). Depending on the use case, in step 305, the top photo, a specific number of photos ranked highest within the list or the entire ranked list of photos may be provided. The photos are then provided for display to the user in response to the user request to view photos associated with a specific point query, region query, text query or other similar indication of a point of interest.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
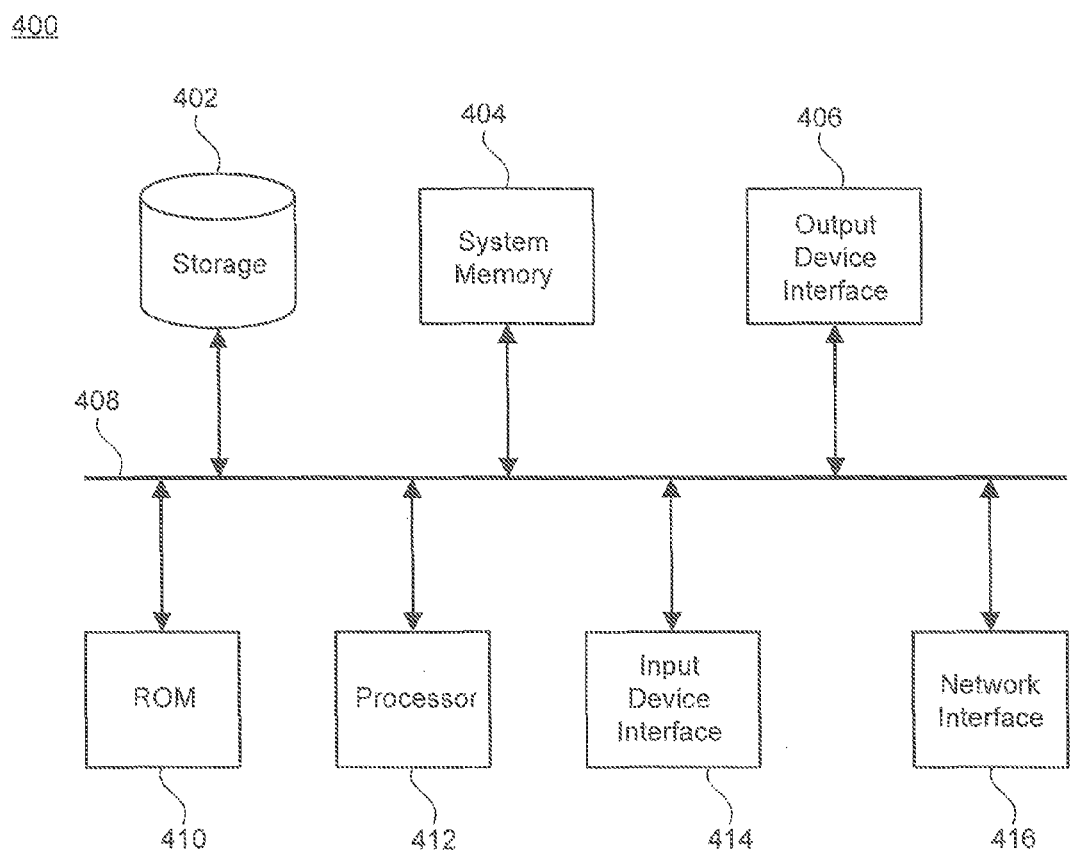
FIG. 4 illustrates an electronic system with which some implementations of the subject technology are implemented.

FIG. 4 conceptually illustrates an electronic system with which some implementations of the subject technology are implemented. Electronic system 400 can be a server, computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for processing, ranking and selecting user generated content including user generated images in accordance with some implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for providing one or more photos, comprising:
   receiving, with one or more computing devices, at a first time a request to view photos associated with a point of interest on a map;
   accessing, with the one or more computing devices, a set of photos associated with the point of interest, each photo in the set having a viewpoint defined by one of a field of view of the photo and a viewing direction of the photo;
   scoring, with the one or more computing devices, individual photos within the set of photos based at least in part on a similarity between the viewpoint of the individual photo and a map viewpoint at the first time; and
   providing for display, with the one or more computing devices, one or more of the individual photos based on the score.

2. The method of claim 1, further comprising:
   identifying a query comprising one of a point within the map, a region within the map, or a text query; and
   identifying the point of interest according to the query.

3. The method of claim 1, wherein the map is partitioned into a plurality of cells,
   wherein accessing the set of photos associated with the point of interest comprises identifying one or more cells of the plurality of cells within the map covering the point of interest within the map, and
   wherein the set of photos comprise one or more photos associated with each of the one or more cells.

4. The method of claim 3, further comprising:
   referencing a spatial index, the spatial index storing an association between each of the plurality of cells within the map and one or more photos; and
   identifying the one or more photos associated with each of the one or more cells.

5. The method of claim 4, wherein the one or more photos for each of the plurality of cells within the spatial index include at least one of one or more photos that see the cell, and one or more photos captured from the cell.

6. The method of claim 5, wherein the spatial index is generated by processing each of the one or more photos through a structure from motion system.

7. The method of claim 1, wherein the set of photos comprise user generated photos.

8. The method of claim 1, further comprising calculating a cost for each photo.

9. The method of claim 8, wherein the map viewpoint at the first time is defined by one or more of a map viewport at the first time, map tilt, map heading and map zoom level.

10. The method of claim 1, wherein the scoring is further based on photo quality of the individual photo, wherein the photo quality is defined by one or more of photo position and orientation, photo popularity, photo alignment, photo contrast, photo saturation or whether the photo is a panorama.

11. The method of claim 1, wherein the scoring is further based on user request information, wherein the user request information includes one or more of text entered by the user to identify the point of interest or photo type requested by the user.

12. A system for providing one or more photos, comprising:
   a memory storing a set of photos in association with a point of interest on a map; and
   one or more processors in communication with the memory, the one or more processors programmed to:
   receive at a first time a request to view photos associated with the point of interest on the map;
   access a set of photos associated with the point of interest, each photo in the set having a viewpoint defined by one of a field of view of the photo and a viewing direction of the photo;
   score individual photos within the set of photos based at least in part on a similarity between the viewpoint of the individual photo and a map viewpoint at the first time; and
   provide for display one or more of the individual photos based on the score.

13. The system of claim 12, wherein the received request comprises one of a selection of a point on the map, a region on the map, or a text query corresponding to a point or region on the map.

14. The system of claim 12, wherein the processor is further programmed to:
   identify one or more cells within the map covering the point of interest, wherein the map is partitioned into a plurality of cells; and
   wherein the set of photos comprise photos associated with each of the one or more cells according to a spatial index, the spatial index indicating an association between each of the plurality of cells within the map and one or more photos.

15. The system of claim 12, wherein the set of photos comprises user generated photos.

16. The system of claim 12, wherein the map viewpoint at the first time is defined by one or more of a map viewport at the first time, map tilt, map heading and map zoom level.

17. The system of claim 12, wherein the scoring is further based on photo quality of the individual photo, wherein the photo quality is defined by one or more of photo position and orientation, photo popularity, photo alignment, photo contrast, photo saturation or whether the photo is a panorama.

18. A non-transitory machine-readable medium comprising instructions stored therein, which when executed by a machine, cause the machine to perform operations comprising:
- receiving at a first time a request to view photos associated with a point of interest on a map;
- accessing a set of photos associated with the point of interest, each photo in the set having a viewpoint defined by one of a field of view of the photo and a viewing direction of the photo;
- scoring individual photos within the set of photos based at least in part on a similarity between the viewpoint of the individual photo and a map viewpoint at the first time; and
- providing for display one or more of the individual photos based on the score.

19. The machine-readable medium of claim 18, wherein the identifying the set of photos comprises:
- referencing a spatial index defining an association between the plurality of cells within the map and one or more photos.

20. The machine-readable medium of claim 18, wherein the set of photos include user-generated photos.

\* \* \* \* \*